United States Patent
Becker et al.

(10) Patent No.: US 6,902,234 B2
(45) Date of Patent: Jun. 7, 2005

(54) VEHICLE SEAT WITH A CATCH ON ONE SIDE AND WITH A RETAINING DEVICE

(75) Inventors: Burckhard Becker, Solingen (DE); Wilfried Beneker, Leichlingen (DE)

(73) Assignee: C. Rob Hammerstein GmbH & Co. KG (DE)

( * ) Notice: Subject to any disclaimer, the term of this patent is extended or adjusted under 35 U.S.C. 154(b) by 189 days.

(21) Appl. No.: 10/354,421

(22) Filed: Jan. 30, 2003

(65) Prior Publication Data

US 2003/0160483 A1 Aug. 28, 2003

(30) Foreign Application Priority Data

Feb. 25, 2002 (DE) .......................................... 102 07 807

(51) Int. Cl.[7] .............................................. B60N 2/427
(52) U.S. Cl. ................................ 297/216.1; 297/216.2; 297/344.15; 248/421; 296/68.1
(58) Field of Search ....................... 297/216.1, 216.15, 297/216.2, 344.15, 344.17; 248/421, 429; 296/68.1

(56) References Cited

U.S. PATENT DOCUMENTS

| | | | |
|---|---|---|---|
| 5,556,159 A | | 9/1996 | Canteleux |
| 5,882,061 A | * | 3/1999 | Guillouet .................... 296/68.1 |
| 6,116,689 A | * | 9/2000 | Bauer et al. ............ 297/344.15 |
| 6,250,705 B1 | * | 6/2001 | Zuch .......................... 296/68.1 |
| 6,398,308 B1 | | 6/2002 | Becker et al. |
| 6,478,378 B2 | * | 11/2002 | Muhlberger et al. ...... 297/216.1 |
| 6,505,888 B1 | * | 1/2003 | Teufel et al. ........... 297/344.15 |
| 6,533,351 B2 | * | 3/2003 | Deptolla ................... 297/216.2 |
| 6,572,065 B2 | * | 6/2003 | Koga et al. .................. 248/421 |
| 6,733,065 B2 | * | 5/2004 | Schindler et al. ...... 296/107.07 |
| 2002/0011746 A1 | | 1/2002 | Muhlberger et al. |

FOREIGN PATENT DOCUMENTS

DE 10020923 A1 12/2001

* cited by examiner

*Primary Examiner*—Peter R. Brown
(74) *Attorney, Agent, or Firm*—Akerman Senterfitt

(57) ABSTRACT

The motor vehicle seat of a motor vehicle comprises an underframe and a seat carrier that is height-adjustably connected to the underframe through rear oscillating cranks. A catch device is directly assigned to one of the two rear oscillating cranks. A non-rotatable tie bar joins the two rear oscillating cranks so that they are parallel when the vehicle seat is subjected to normal load. A retaining device has a sector gear firmly connected to the other one of the two rear oscillating cranks. An engaging piece which is movably disposed on the seat carrier or on the underframe, is provided with teeth devised for engagement with the sector gear and is disengaged from the sector gear as long as the vehicle seat is subjected to normal load. When the associated motor vehicle is subjected to a crash load an actuator is activated and causes the engaging piece to move into positive mesh with the sector gear. It is activated both for a positive and for a negative acceleration of the vehicle seat in the event of an accident. The teeth of the sector gear are configured in such a manner that their flanks, which are located on either side thereof, are oriented substantially radially relative to the orientation of said sector gear so that, during an accident situation, the sector gear is locked in the two directions of rotation upon engagement of the engaging piece.

10 Claims, 5 Drawing Sheets

VEHICLE SEAT WITH A CATCH ON ONE SIDE AND WITH A RETAINING DEVICE

BACKGROUND OF THE INVENTION

The invention relates to a motor vehicle seat with a) an underframe with b) a seat carrier that is height-adjustably connected to the underframe through a left rear oscillating crank and through a right rear oscillating crank, with c) a catch device which is directly assigned to one of the two rear oscillating cranks and permits to adjust and lock the angular position of said crank relative to the underframe, with d) a non-rotatable tie bar that joins the two rear oscillating cranks so that they are parallel when the vehicle seat is subjected to normal load, with e) a retaining device having a sector gear firmly connected to the other one of the two rear oscillating cranks, an engaging piece which is movably disposed on the seat carrier or on the underframe, is provided with teeth devised for engagement with the sector gear and is disengaged from the sector gear when the vehicle seat is subjected to normal load, and an actuator that is activated when the associated motor vehicle is subjected to a crash load and causes the engaging piece to move into positive mesh with the sector gear.

A motor vehicle seat of this type is described in PCT/EP 00/10692. EP 0 577 517 B1 shows a similar vehicle seat. The first mentioned reference describes what is termed a crash stop that is activated when a load limit is exceeded, a change in the geometry of a height-adjuster for example being taken into consideration for sensing a load limit. Two crash stops are suggested, the one crash stop becoming active for positive accelerations of the seat such as during rear collisions. The other crash stop is activated for negative accelerations as they are typical with frontal crashes.

EP 0 577 517 B1 describes a hinged oscillating lock whose excursion in accident situation is utilized to block a joint so that a crash stop may engage.

These previously proposed crash stops have the disadvantage that the respective accident situation of the vehicle seat is sensed by special elements that are associated to the respective one of the crash stops only. Said elements must be devised and sized in such a manner that they reliably react in the most varied accident situations, e.g., during a vehicle collision in the direction of a diagonal of the vehicle. It must further be made certain that the locking occurs early enough in case of a crash, i.e., before the parts were able to move relative to one another. It is thus made certain that the joint regions need not deform prior to engagement of a stop. Deformation prior to said engagement is critical, particularly because it may occur in different ways depending on the direction of the crash so that reliable locking cannot always be achieved in an accident situation.

The invention is directed to such type vehicle seats that have a catch on one side. One of the two rear oscillating cranks is directly assigned a catch device. Through the non-rotatable tie bar the other rear oscillating crank is retained in the same angular position as the rear oscillating crank which is provided with the catch device. This construction permits easy, light-weighted and secure configuration and immobilization of the vehicle seat under normal operating conditions. It is thus not necessary to transmit the adjustment of the catch to the other seat side and to provide the latter with a complete catch device.

In such vehicle seats, the catch of the directly immobilized rear oscillating crank may be configured using appropriate measures in such a secure manner that it is kept immobilized during an accident. For an example, the reader is referred to the documents DE 199 44 866.3 and DE 100 20 923.8.

In accident situations however, that side of the seat which is not directly immobilized must be additionally locked or otherwise secured to prevent it from deforming more than the directly locked seat side during an accident. Crash stops are suited for this purpose.

SUMMARY OF THE INVENTION

The invention is based on this situation. It is the object thereof to develop the vehicle seats of the type mentioned herein above in such a manner that the not directly locked rear oscillating crank is sufficiently and crash resistantly locked in any accident situation and that a secure locking of said not directly locked rear oscillating crank is achieved at the earliest possible stage.

In view of the vehicle seats of the type mentioned herein above, the solution to this object is that the actuator is activated both for a positive and for a negative acceleration of the vehicle seat in the event of an accident and that the teeth of the sector gear are configured in such a manner that their flanks, which are located on either side thereof, are oriented substantially radially relative to the orientation of said sector gear so that, at the beginning of an accident situation, the sector gear is locked in the two directions of rotation upon engagement of the engaging piece.

In this vehicle seat, the catch device provided on the seat side, meaning on the rear oscillating crank to which it is assigned, performs the function of immobilization both in normal use and during deceleration of the vehicle in which the vehicle seat is mounted during accidents. Deceleration such as during accidents is when an electronic monitoring circuit of an airbag responds. The response threshold may be chosen to be of a different type with positive than with negative accelerations. The immobilization of the other rear oscillating crank is achieved by cooperation between sector gear and engaging piece. The sector gear may be configured in just the same way as that of the directly immobilized rear oscillating crank. The engaging piece is moved into mesh with the sector gear by means of the actuator. Said actuator is electronically activated when the vehicle in which the vehicle seat is located experiences an acceleration during an accident. At first, and due to said acceleration, the front part of the motor vehicle may for example just start to deform. At that point, it is possible that an acceleration of the vehicle seat due to an accident cannot yet be determined. But, as the deceleration of the vehicle is being sensed, the other oscillating crank, by which always the directly immobilized rear oscillating crank is meant, may be locked at a very early stage, in any case before noticeable relative movements within the vehicle seat occur.

The teeth of the sector gear and the teeth of the engaging piece are configured in such a manner that they are provided with flanks or means which lock in either direction of rotation. That is to say, the shape chosen for the sector gear is not for example a serrated one as it is usual according to the prior art, the teeth are rather largely symmetrical. At their tip they are preferably provided with a non-flat area that allows engagement even if a position is achieved in which the teeth are resting on each other. The teeth are rather configured with a rounded, pointed or otherwise non-flat tip so that engagement is always achieved.

In an alternative embodiment it is also possible to configure the engaging teeth of the engaging piece in a manner as described in DE 27 29 770 C2, the clear spacing between two engaging teeth corresponding to the width of a tooth of the sector gear and the clear spacing between two teeth of the sector gear corresponding to the exterior spacing between two neighboring teeth of the engaging piece. With this geometrical configuration or with an accordingly even smaller configuration of the teeth or of the engaging means of the engaging piece it is made certain that at least one tooth of two or more teeth of the engaging piece is capable of reliably meshing with the teeth of the sector gear.

Thanks to the flanks, which are substantially oriented in the radial direction, of both the teeth of the engaging piece and the teeth of the sector gear it is achieved that the other rear oscillating crank as well is locked when subjected to a crash load.

The invention makes it possible to lock with simple means the other oscillating crank as well at the beginning of a crash. In the normal case the additional stop is not effective and is not noticeable during normal driving conditions of the vehicle. It only becomes active when the vehicle decelerates in an accident situation and is activated by an electronic circuit as it is also used for enabling the airbag. It is thus made certain that crash forces acting at a slant angle relative to the longitudinal axis of the vehicle for example are also sensed and that the other rear oscillating crank is sufficiently locked in this case as well.

In a preferred development of the invention the engaging piece is configured into a substantially annular shape and entirely encloses the sector gear. Said sector gear in turn is preferably realized in a long hole, meaning it is closed on all sides. As a result thereof, the sector gear and the engaging piece are inseparably joined together. In this way, lateral relative excursion of the parts during an accident is additionally reliably prevented and an additional catch position is moreover achieved.

In the preferred embodiment, the actuator is an ignitable powder charge. Said powder charge is preferred to be simultaneously used for other purposes, for a belt tightener for example. Usually, the actuator of a belt tightener is arranged substantially parallel to the underframe. The safety belt to be tightened is pulled downward in the region of the buckle. A flexible traction means, more specifically a cable, that is deflected is provided for this purpose. Upon the sensing of a vehicle crash, i.e., at the beginning of an accident situation, the movement of the cable, the load of the deflection point, the rotation of a deflection pulley or the like is used to move the inventive lock of the other rear oscillating crank into mesh.

BRIEF DESCRIPTION OF DRAWINGS

Further advantages and characteristics of the invention will become apparent in the other claims and in the following non restrictive description of embodiments thereof, given by way of example only with reference to the drawing in which

DETAILED DESCRIPTION OF THE INVENTION

Figure 1:
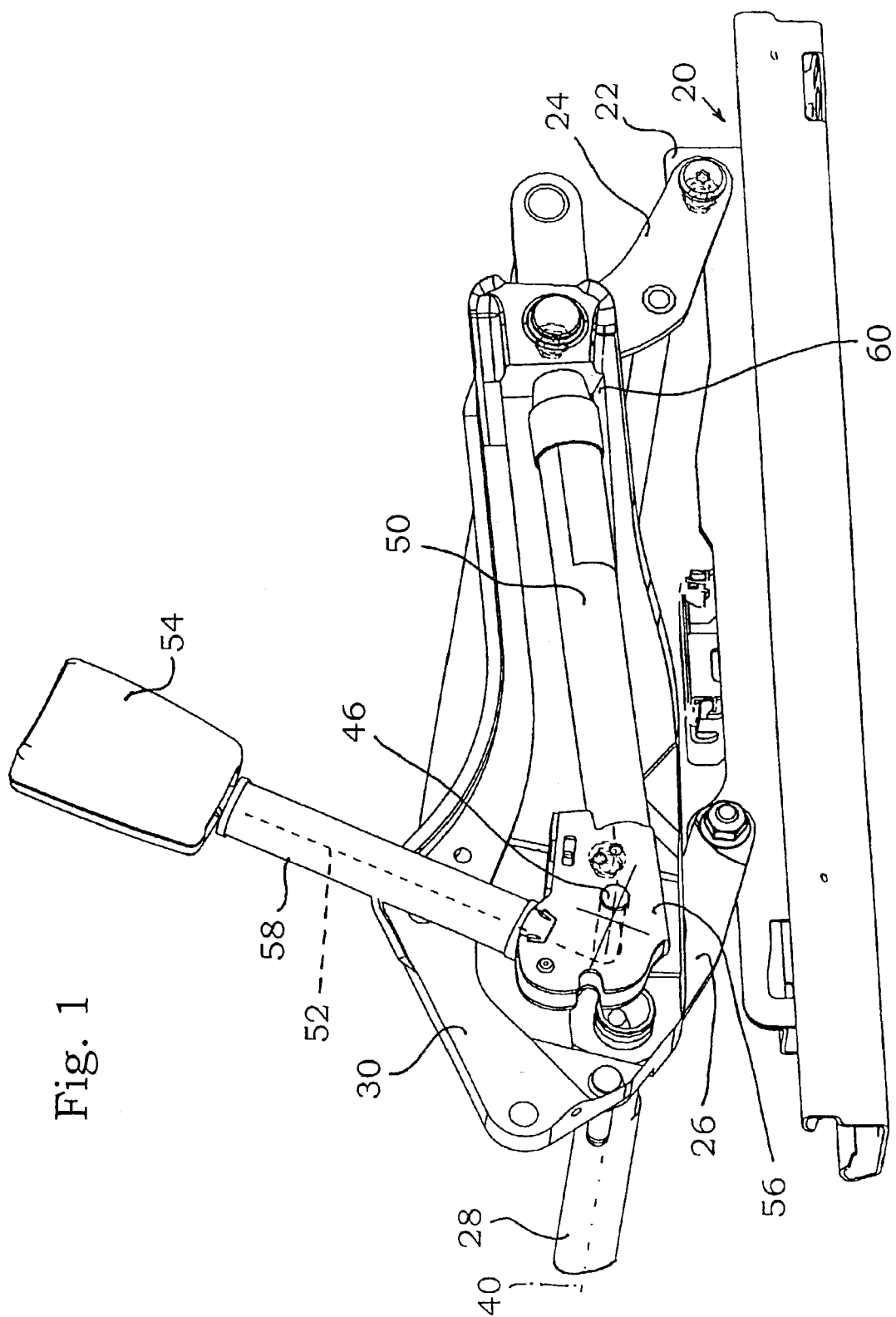
FIG. 1 is a perspective view, substantially a side view, of a right side of an underframe of a motor vehicle seat viewed obliquely from the back.
Figure 2:
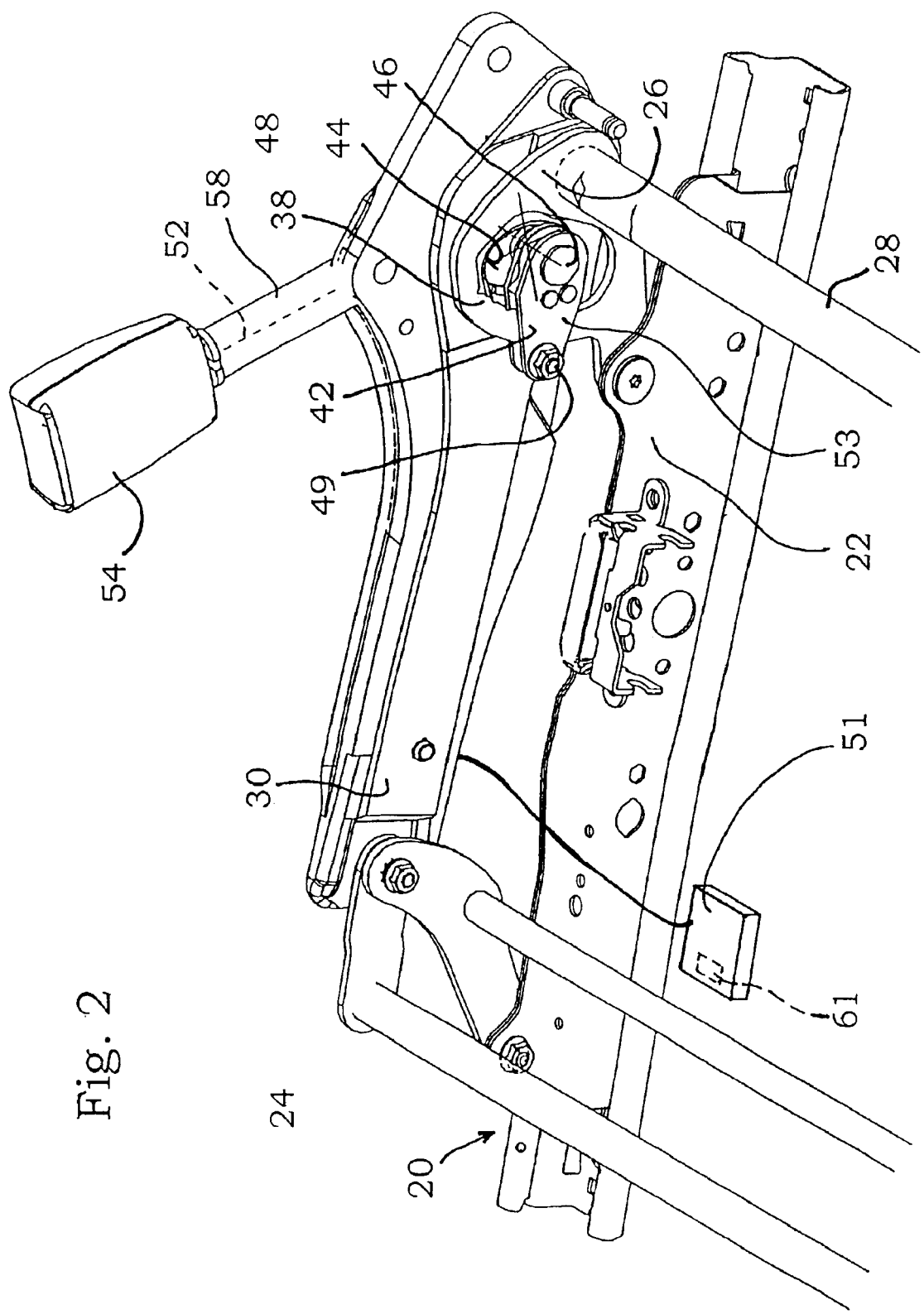
FIG. 2 is a perspective view of the portion of vehicle seat shown in FIG. 1, this time viewed from within obliquely from the top.

The FIGS. 1 through 5 each show only part of an underframe of a vehicle seat. The FIGS. 1, 2, 4 and 5 only show one couple of rails with a seat rail 22 and an associated bottom rail pertaining to a lengthwise adjustment device 20. Either seat rail 22 is hinge-linked to a front pivoting support 24 and to a rear oscillating crank. The FIGS. 1, 2, 4 and 5 only show the right rear oscillating cranks 26. The left rear oscillating crank is built according to substantially the same principle. They are arranged, and more specifically immobilized, in a manner well known in the art; in this connection, the reader is referred to DE 198 36 425.3.

The two rear oscillating cranks are rotationally joined together by a tie bar 28. The left rear pivoting support (not shown) is adjusted with the catch device illustrated in FIG. 3 and mentioned herein above. The right rear pivoting support is given its angular position by the tie bar 28. Thus, the right rear oscillating crank 26 is not immobilized under normal driving conditions of the vehicle in which the vehicle seat is located. Immobilization is carried out in the event of an accident. This will be explained in closer detail herein after.

The two front pivoting supports 24 and the two rear oscillating cranks 26 carry a seat carrier 30 provided with two side parts, the right side part 30 being shown in the FIGS. 1, 2, 4 and 5. A U-shaped connection part, which may be surveyed from the FIGS. 2 and 4 and which at the same time forms the front edge of the mechanical portion of the underframe, also pertains to said seat carrier.

Figure 3:
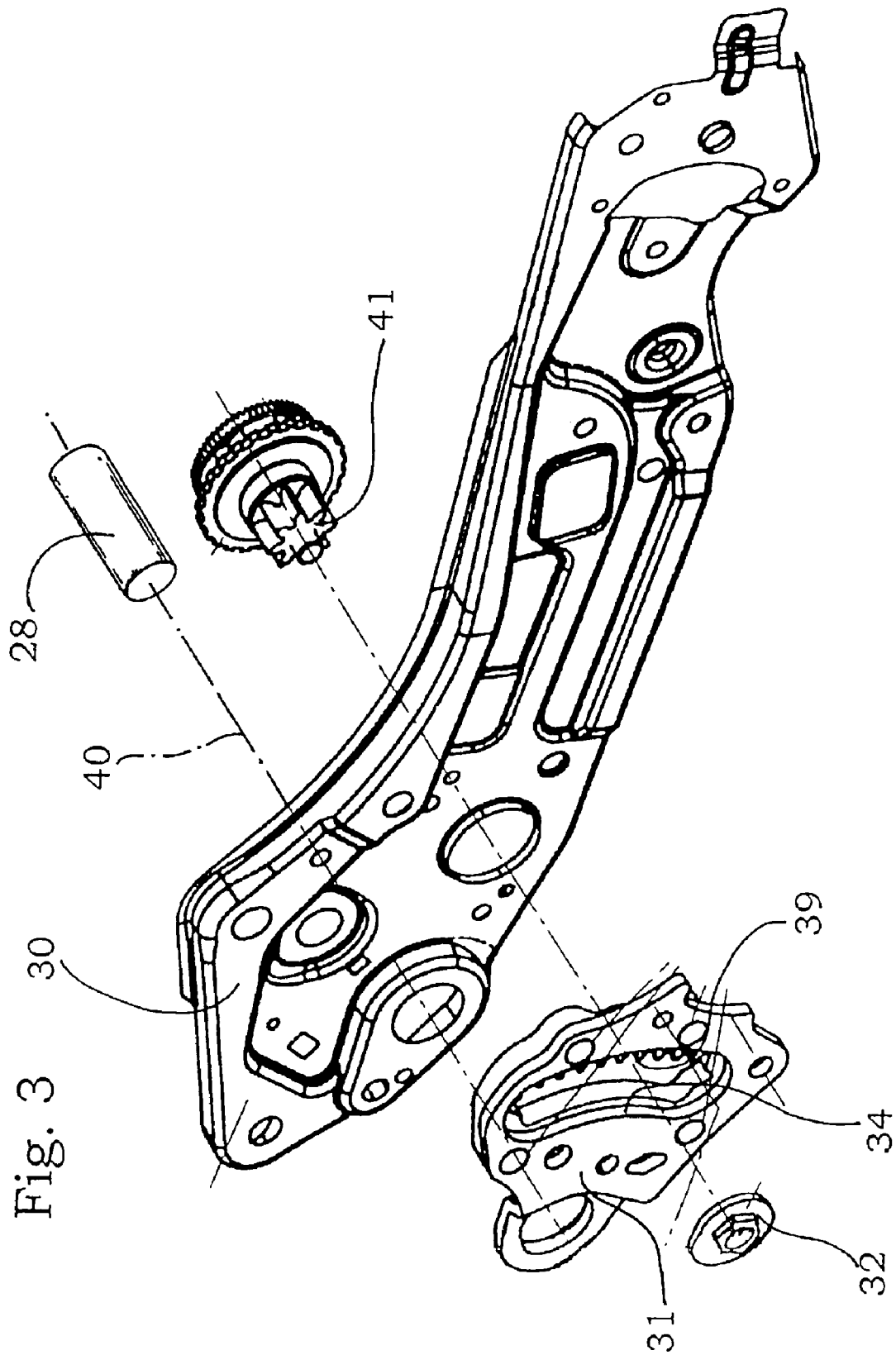
FIG. 3 is a perspective view in the form of an assembly drawing of parts of a left seat side with a left side part and a catch device.

The height adjustment of the seat carrier is performed in a manner known in the art and is either manual or motor-driven. As shown in FIG. 3, a sector gear 39 is provided in a catch arm 31 that is rigidly connected to the left rear oscillating crank, said sector gear being centered on the upper pivot point of the oscillating crank (not shown) on the associated left side part 30. A pinion 41 meshes with said sector gear 39 and a ratchet is mounted behind said pinion. It is actuated through an actuation device (not shown). The pinion 41 may also be motor-driven. The reader is specially referred to the already mentioned document DE 198 36 425.3 and to the reference DE 298 14 448.4. The entire content of these previous publications are incorporated herein by reference. Those means are of particular importance which ensure the immobilization of the left seat side according to FIG. 3 even if it is subjected to crash loads. A disc 32, a protruding edge 34 in proximity to the sector gear 39 and so on are to be pointed out here.

The right rear oscillating crank 26 has a sector gear 38 located within a long hole. Said sector gear is centered on the upper pivot joint of said rear oscillating crank 26 and, as a result thereof, on the axis 40 of the tie bar 28. Between the sector gear 38 and a front edge of the oscillating crank 26, which is also centered on axis 40, there is a region of said oscillating crank 26 that is annularly surrounded by an engaging part 42 which will be described in closer detail herein after. It has two side pieces 53 that are built according to the same principle and have an approximately oval shape. They are spaced apart so that the oscillating crank 26 and, as a result thereof, the sector gear 38 are capable of freely pivoting therein between. They are joined together by a bolt 46 in the region of the recess of the rear right oscillating crank 26. Said bolt extends through a long hole 44 of the right side part 30 and is thus accessible from outside said side part. There, it is connected to a tightening unit which comprises an actuator 50. Said actuator is configured to form a drive cylinder with a powder charge.

Further, the two side pieces 53 of the engaging part 42 are joined together through a hinge bolt 49 on the one hand, said connection providing sufficient spacing between the two side pieces 53, and are hinged to the side part 30 on the other hand. As a result thereof, the engaging part 42 is capable of pivoting about the axis of the hinge bolt 49.

Between the two side pieces 53 and in proximity to the sector gear 38 there is provided a locking means 48 having engaging means, more specifically teeth or pins. The locking means 48 is configured in such a manner that it does not interact with the sector gear 38 in the normal operating condition of the motor vehicle. In the event of an acceleration during an accident situation, a positive engagement is obtained when the engaging part 42 is pivoted about the bolt 46 or about the hinge bolt 49, or when it is moved in any other way, and when the movement is sufficient to allow the engaging means of locking means 48 to mesh with the teeth of the sector gear 38.

As a matter of fact, the meshing between engaging part 42 and sector gear 38 is brought about by the rotation of the bolt 46 occasioned by the activation of the mechanical unit 50 of the tightening unit, said rotation moving said engaging part and said sector gear into mesh.

The actuator 50 is electrically activated by a control circuit 51 that has been illustrated herein only schematically. The control circuits used here are those also used to enable airbags. More specifically, the control circuit used is the same as that assigned to at least one airbag of the motor vehicle. It has an acceleration sensor 61.

Once activated, the actuator 50 develops a high tensile load applied to a means 52 with tensile strength in the form of a cable. This pull causes a buckle 54 to be pulled downward, toward the side part 30. The drive cylinder is fastened within a housing 56 that also transmits the reaction force and accommodates the means 52 with tensile strength. In said housing 56, a bore is provided for bolt 46 about which the means 52 with tensile strength is wrapped. The angle of wrap amounts to approximately 120°. The means with tensile strength is accommodated in a resilient sheath 58 between housing 56 and buckle 54. Said sheath deforms upon activation of the actuator 50, it becomes shorter. Upon completion of the activation, the actuator 50 does not release the means 52 with tensile strength, it rather retains, e.g., immobilizes it, in its retracted position.

The actuator 50 in the form of a drive cylinder is supported at its free end facing the front edge 34 of the seat. Said end is located in proximity to a bearing area 60 connected to the side part 30. In another embodiment (not shown), an abutment is provided underneath the front end.

The activated actuator 50 pulls the means 52 with tensile strength about the bolt 46 nearer, which causes the buckle to be pulled downward. Since the entire tightening unit including the buckle 54 is fastened to the bolt 46 only, it is capable of pivoting about said bolt. In the normal operating condition of the motor vehicle, pivoting movement is excluded, the bolt 46 is sufficiently tightened or a safety means, a safety pin for example, is provided which fixes the normal position of housing 56 and is overcome or destroyed in the event of an accident.

Upon activation of the actuator 50, the entire tightening unit pivots about bolt 46, in FIG. 1 in the clockwise direction. This movement is brought about by the tightening unit pivoting about the axis of bolt 46 whereas the pull is applied to the exterior area of the bolt. In more factual terms, the pull is applied somewhat beneath the rotational axis so that the clockwise pivot motion described herein above is caused to occur. This pivoting movement causes engaging part 42 and sector gear 38 to move into mesh. In order to limit said pivoting movement, there is provided the bearing area 60 or a corresponding abutment on side part 30. The corresponding abutment may also be assigned to the housing of the actuator 50. What matters is that the maximum angle through which the entire tightening unit may pivot about bolt 46 is limited.

When the control circuit 51 senses an accident situation, the actuator 50 is activated as early as possible. Generally, at this point, the rear right oscillating crank, which has only been retained hereto before by the tie bar 28, has not yet moved, but starts moving now in order to adjust under the action of the forces generated by the accident. This also causes the sector gear 38 to move about the axis of the tie bar 28.

Once the actuator 50 is activated, the locking means 48 of engaging part 42 gets in proximity to the teeth of the sector gear 38. At their base at least, the teeth of sector gear 38 are oriented substantially radially, i.e., on a joining line relative to the axis of the tie bar 28. They are capable of locking in both directions of rotation as a result thereof. The locking means 48 are configured accordingly.

In the embodiments according to the FIGS. 1, 2 and 4, 5, the projections or teeth of the locking means 48 may be moved into a position in which they are placed upon the teeth of sector gear 38 when the actuator 50 is activated. Still, the engaging part is not rejected, not even in this condition, the teeth of sector gear 38 having such rounded tips and the engaging means 48 being configured in such a manner that engagement is always achieved. Engagement is also facilitated by the starting rotation of sector gear 38, as explained herein above. Secure engagement is altogether achieved.

Figure 6:
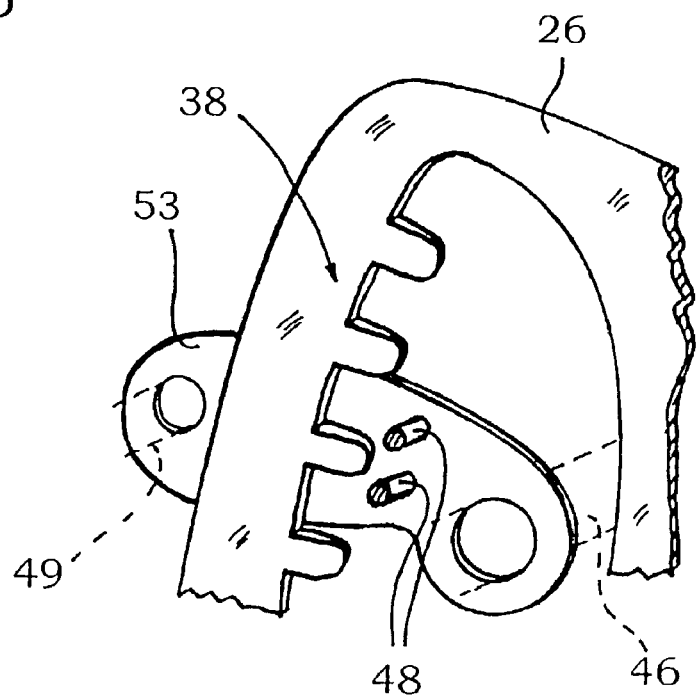
FIG. 6 is a perspective view of a sector gear and of an engaging piece for a third exemplary embodiment of the invention.

The reader is already referred to FIG. 6. This FIG. shows a particular configuration and association of the teeth of sector gear 38 and of the engaging means of engaging part 42 that cooperate therewith. According to the teaching of DE 27 29 770 C2, the engaging means 48, which are configured as two pins, are spaced a clear distance apart, said distance corresponding to the width of one tooth of the engaging part 42. The outer spacing of the two engaging means 48 is thus that it equals the spacing between two teeth of the sector gear. As a result thereof, at least one of the two engaging means is forcibly moved into a gap between two teeth of the sector gear 38. Thus, only one engaging means may happen to be brought into a "tooth-upon-tooth" position and not the two engaging means simultaneously.

Figure 4:
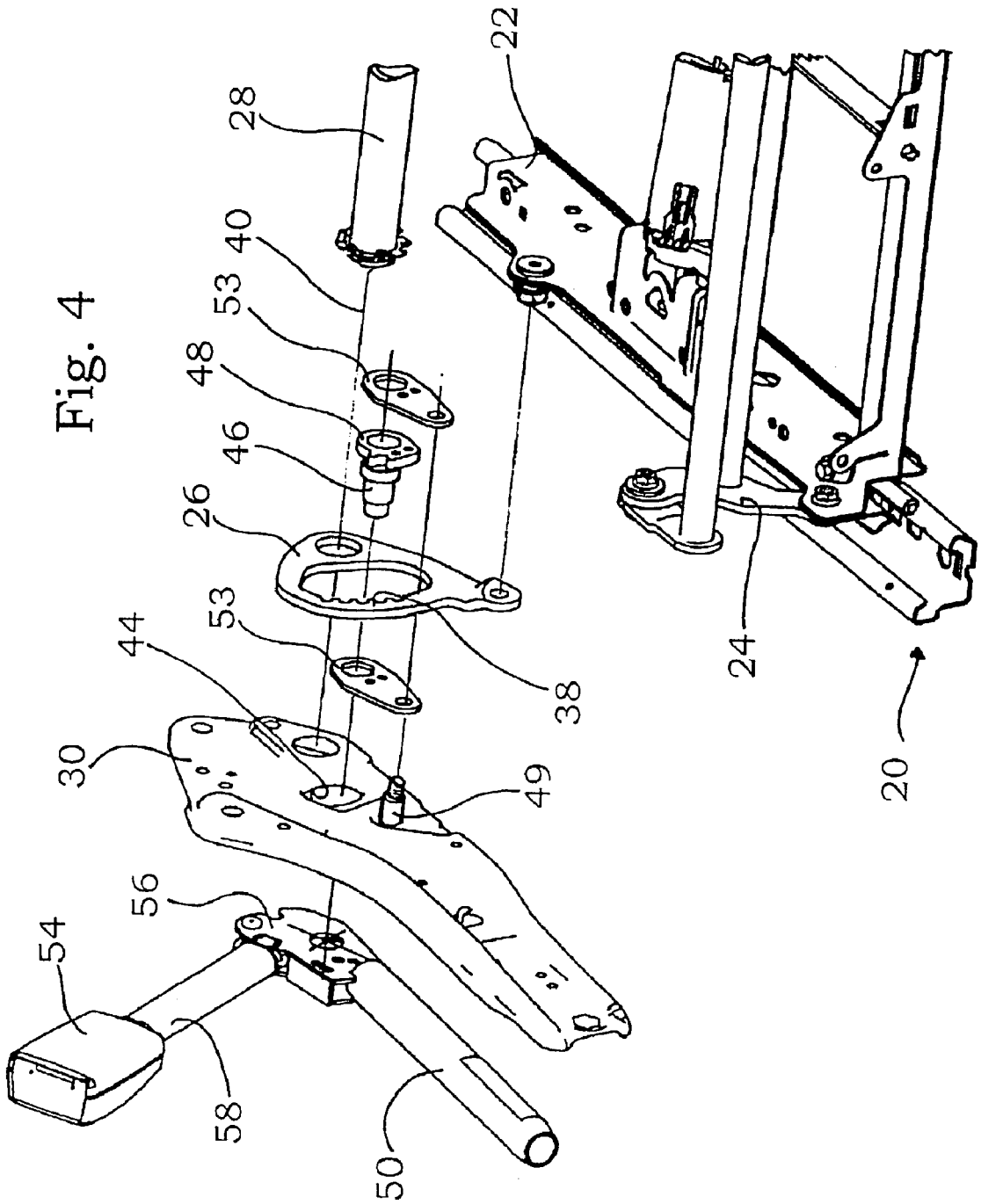
FIG. 4 is an assembly drawing of a second embodiment of the invention, for a right seat side again.
Figure 5:
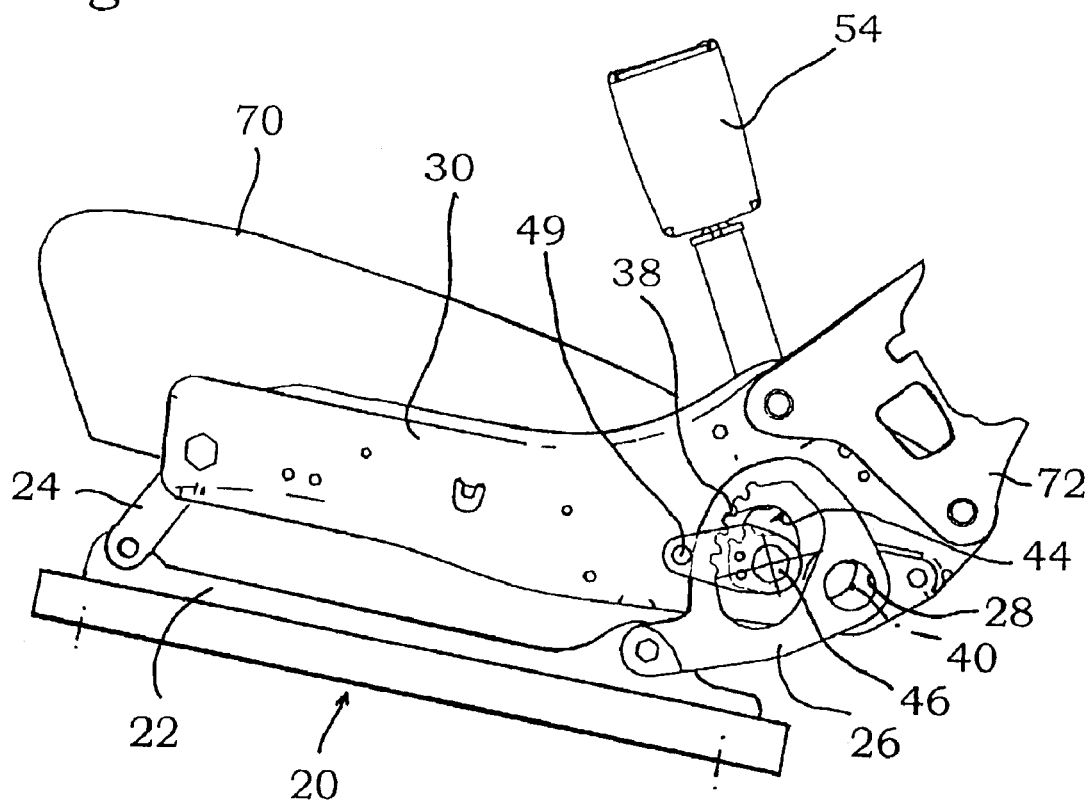
FIG. 5 is a side view of the vehicle seat of FIG. 3 viewed from within.

As more specifically shown in the FIGS. 4 and 5, the locking means 48 of this exemplary embodiment has two teeth that are provided with rounded tips and are slightly thinner than the clear spacing between two teeth of the sector gear 38. The respective one of the two teeth of the locking means 48 has flanks that are substantially parallel, at least in a portion thereof, so that the engagement has substantially the same quality in the two directions of rotation. These flanks are not oriented through the axis of the bolt 46 though, they rather cross a joining distance between the two bolts 46, 49 a few millimeters (in the direction of travel) in front of the center of the bolt 46.

The exemplary embodiment according to the FIGS. 4 and 5 also shows a bottom cushion 70 of the seat, which is located between the side parts 30, and a portion 72 of a pivot joint for a seat back (not shown).

The invention has been explained for a vehicle seat in which the normal catch of the height adjustment device of the seat is disposed on the left seat side and in which the buckle is located on the right seat side. If the conditions are reversed, meaning if the buckle is located on the left seat side and if the normal immobilization is performed on the right side, the above embodiments also apply, only with changed sides.

What is claimed is:

1. A motor vehicle seat for motor vehicle, the motor vehicle seat comprising a) an underframe, b) a seat carrier that is height-adjustably connected to the underframe through a left rear oscillating crank and through a right rear oscillating crank, c) a catch device for adjusting and locking the angular position of said crank relative to the underframe, which catch device is directly assigned to one of the two rear oscillating cranks, d) a non-rotatable tie bar that joins the two rear oscillating cranks so that they are parallel when the vehicle seat is subjected to normal load, and e) a retaining device having a sector gear firmly connected to the other one of the two rear oscillating cranks, an engaging piece movably disposed on the seat carrier or on the underframe, which engaging piece is provided with engaging means, devised for engagement with the sector gear, the engaging piece being disengaged from the sector gear when the vehicle seat is subjected to normal load, and an actuator disposed for activation when the associated motor vehicle is subjected to a crash load, the actuator being arranged to cause the engaging piece to move into positive mesh with the sector gear, the actuator being activated both for a positive and for a negative acceleration of the vehicle seat in the event of an accident and teeth of the sector gear which teeth have flanks located on either side of the teeth, the teeth being oriented substantially radially, during an accident situation, the sector gear being locked in the direction of clockwise rotation and in the direction of anti-clockwise rotation of the engaging piece upon engagement of the engaging piece.

2. The vehicle seat according to claim 1, wherein the sector gear is centered on the tie bar.

3. The vehicle seat according to claim 1, wherein the teeth of the sector gear have a non-flat tip.

4. The vehicle seat according to claim 1, wherein the engaging piece has teeth and the teeth of the engaging piece have a non-flat tip.

5. The vehicle seat according to claim 1, wherein gaps are provided between the teeth of the sector gear, the engaging piece has teeth and wherein, between their flanks, the teeth of the engaging piece are thinner than the gaps between neighboring teeth of the sector gear so that, when a tooth of the engaging piece engages between two teeth of the sector gear, an air-gap remains between said tooth of the engaging piece and the two teeth of the sector gear.

6. The vehicle seat according to claim 1, wherein the actuator has an ignitable powder propellant charge and wherein an electronic circuit is provided having an acceleration sensor and being designed for igniting the powder propellant charge.

7. The vehicle seat according to claim 1, wherein the engaging means are teeth.

8. The vehicle seat according to claim 1, wherein a pivot joint is located on the seat carrier and the sector gear is centered on the pivot joint.

9. The vehicle seat according to claim 1, wherein the teeth of the sector gear have a rounded or pointed tip.

10. The vehicle seat according to claim 1, wherein the engaging piece has teeth and the teeth of the engaging piece have a rounded or pointed tip.

* * * * *